Dec. 6, 1955 F. J. WYTHE 2,725,681
CAM CONTROLLED GLASS FEEDER PLUNGER OPERATING MECHANISM
Filed April 30, 1954
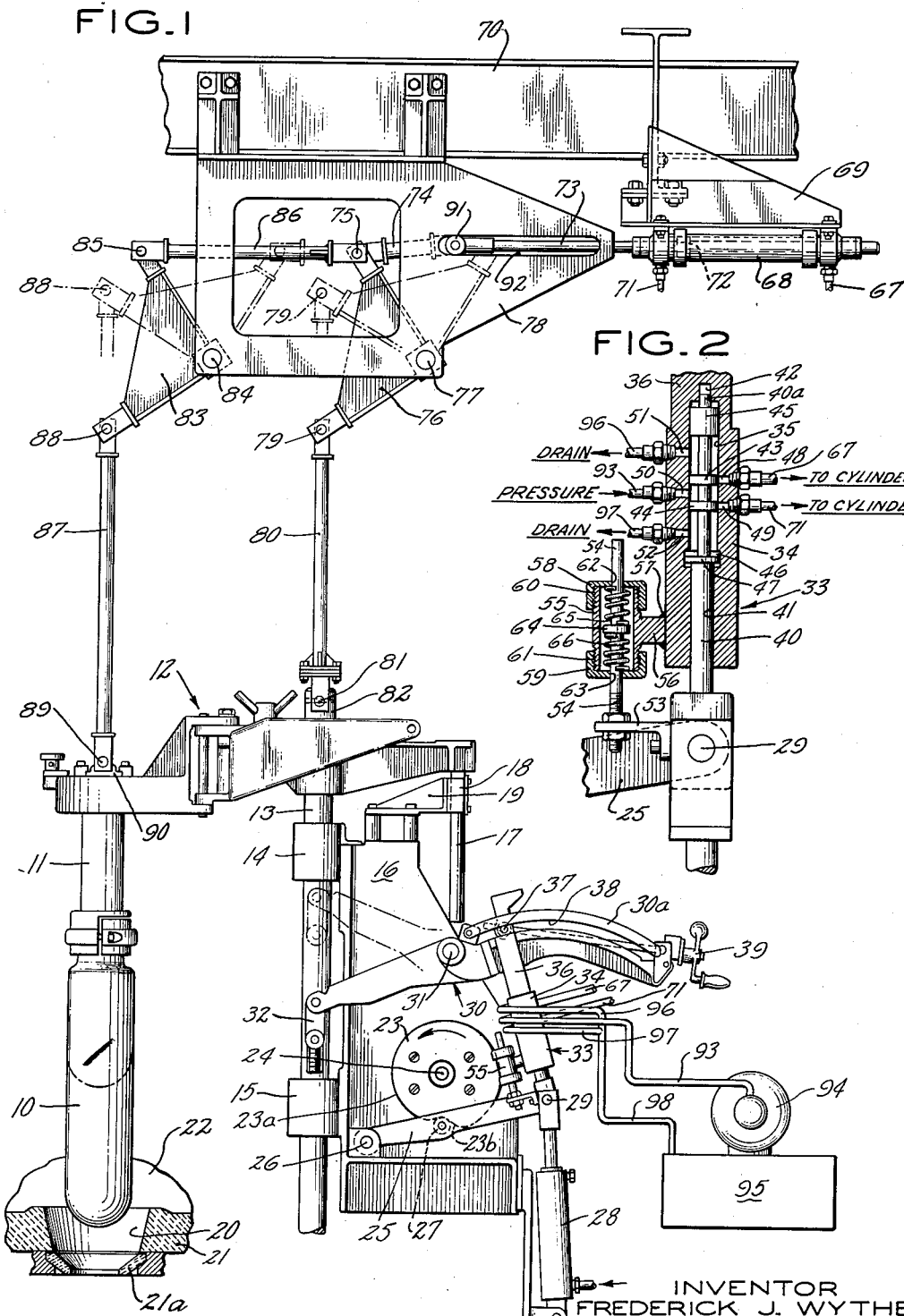
INVENTOR
FREDERICK J. WYTHE
BY Bates & Willard
ATTORNEYS

United States Patent Office 2,725,681
Patented Dec. 6, 1955

2,725,681

CAM CONTROLLED GLASS FEEDER PLUNGER OPERATING MECHANISM

Frederick J. Wythe, Hebron, Conn., assignor to Emhart Manufacturing Company, Hartford, Conn., a corporation of Delaware Application April 30, 1954, Serial No. 426,888

10 Claims. (Cl. 49—55)

This invention relates to improvements in cam controlled glass feeder plunger operating mechanisms, especially of the type comprising a feeder plunger carried by an arm that projects laterally from a vertically movable supporting vertical shaft so that the feeder plunger is positioned above and in axial alignment with a feed orifice in the bottom of a molten glass containing feeder bowl or spout, a cam rotating about a horizontal axis and having successive plunger rise and plunger descent portions and a lever and linkage transmission system operatively disposed between the rotating cam and the plunger arm supporting vertical shaft.

In a feeder plunger operating mechanism of the character described, the cam customarily is mounted on a rotary shaft which is rotated by an electric motor. The use of a relatively large and heavy plunger, as may be required for the feeding of extremely heavy mold charges, as for example, charges of 25 lbs. or more for the production of television tube face plates or other large glass articles, imposes an excessive power demand on the cam and its electric drive motor assembly and on the lever and linkage transmission system between the cam and the plunger arm supporting vertical shaft.

An object of the present invention is to relieve the cam and motor assembly and the transmission of at least most of the power demands thereon when a relatively large and heavy feeder plunger is employed.

A further and more specific object of the invention is to provide a hydraulic servo motor system operatively connected with the vertically movable plunger assembly and controlled by valve means interposed in the lever and linkage system between the cam and such plunger supporting assembly so that the hydraulic servo motor will take over at least most of the power demands that otherwise would be wholly imposed on the cam and motor assembly and on such transmission and will raise and lower the plunger with strokes having characteristics determined by the co-action of the cam with the lever and linkage system.

A further object of the invention is the provision of a cam controlled feeder plunger operating mechanism having a hydraulic servo motor system operatively connected with the plunger assembly and including a four-way hydraulic control valve comprising a movable part arranged to be given a cycle of movements by each complete rotation of the cam and a second cooperative movable valve part arranged to be moved when the plunger assembly is moved together with a damping device interconnecting the two movable valve parts to limit relative movements of these parts from a particular relationship thereof and to tend to restore such particular relationship.

Other objects and advantages of the invention hereinafter will be pointed out or will become apparent from the following description of a practical embodiment of the invention, as shown in the accompanying drawings, in which:

Fig. 1 is a fragmentary and somewhat diagrammatic view, mainly in elevation, showing a hydraulic servomotor system operatively connected with a vertically movable feeder plunger assembly with which a cam actuated lever and linkage system also is connected, the hydraulic servo motor system including a hydraulic control valve comprising two relatively movable parts incorporated in the lever and linkage system and a damping device being operatively associated with these valve parts;

Fig. 2 is a fragmentary, relatively enlarged, somewhat diagrammatic view of the hydraulic control valve while is incorporated in the lever and linkage transmission system and of the associated damping device, the view being mainly in vertical section with parts shown in elevation.

Referring now to Fig. 1, a feeder plunger 10 depends from a chuck 11 which in turn depends from the outer end portion of the laterally projecting supporting arm 12 on a vertical supporting shaft 13. The supporting shaft 13 is mounted for vertical movements in vertically spaced bearings 14 and 15 carried by a stationary frame structure 16. A vertical guide rod 17 depends from the supporting arm 12 at the side of the supporting shaft 13 opposite the plunger 10, such guide rod extending slidably through a suitably apertured guide member 18 on a bracket 19 of the stationary frame structure 16. The arrangement is such as to position the feeder plunger 10 above and in line with a feed outlet 20 in the bottom 21 of a refractory spout 22 which in the service of the feeder is supplied with molten glass from which glass is fed downwardly through the outlet 20. A suitable orifice ring 21a is shown operatively applied to the lower end of the feeder outlet 20 and only a small fragmentary portion of the feeder spout is shown. A cam 23 is mounted on a horizontal rotary cam shaft 24 carried by the frame structure 16. This cam is of the conventional type and its periphery is formed to provide a plunger rise portion 23a and a plunger descent portion 23b. A cam follower lever 25 is mounted at one end on a horizontal pivot element 26 carried by a portion of the stationary frame structure 16 so that a cam roll follower 27 on an intermediate portion of the lever 25 bears against the periphery of the cam 23 at the bottom edge of the latter. A conventional air spring 28 or other yieldable pressure-applying device is operatively connected, as at 29, with the lever 25 so as to maintain the cam roll follower 27 continuously against the periphery of the cam 23.

A plunger stroke lever 30 is intermediately mounted on the stationary frame structure 16 above the cam 23, as by a horizontal pivot element 31. One end of stroke lever 30 is operately connected, as by a linkage arrangement, indicated at 32, with the vertically movable supporting shaft 13. A rigid link customarily is provided operatively to connect the outer end of cam follower lever 25 with the stroke lever 30 at the opposite side of supporting pivot element 31 from the supporting shaft 13. With such a structural arrangement, rotation of the cam 23 about the axis of its supporting shaft 24, as in the direction indicated by the arrow, would cause downward movement of the lever 25 and this in turn would actuate the stroke lever 30 so as to raise the shaft 13, supporting arm 12 and the feeder plunger 10 as a unit. This causes an up stroke of the feeder plunger. Thereafter, the plunger 10, arm 12 and shaft 13 would descend by gravity at a rate determined by the plunger descent portion of the cam surface as and when the rotation of the cam brought that portion of its working surface against the follower roll 27 on lever 25. In carrying out the present invention, the rigid link referred to as customarily provided between levers 25 and 30 is omitted and these levers are connected to each other by a hydraulic servomotor control valve and associated damping device, as now will be explained.

A four-way valve, generally designated 33, comprises an elongate body part 34 formed internally to provide a longitudinal cylindrical valve chamber 35 therein, as best seen in Fig. 2. This valve body 34 has an end extension 36 which may be integral therewith. The end extension 36 is pivotally and adjustably attached to the free end portion, designated 30a, of stroke lever 30. This connection is at the opposite side of pivot element 31 from the vertical shaft 13. As shown, a horizontal pivot element 37 is carried by and projects from end extension 36 into an arcuate retaining slot 38 which extends in lever end portion 30a longitudinally thereof. An adjusting device 39 is provided for adjusting the position of the pivot element 37 along the arcuate slot 38. Any suitable known means may be employed to connect valve body end extension 36 pivotally with lever end portion 30a so that the point of such connection may be adjusted along the lever end portion 30a.

A valve stem part 40 extends slidably through an axial bore 41 in the lower end portion of valve body 34 through the chamber 35 and may terminate in a reduced upper end portion 40a projecting into a short relatively reduced upward end extension 42 of valve body chamber 35. Within the chamber 35, the valve stem carries a pair of vertically spaced narrow cylindrical lands, constituting valve elements 43 and 44, respectively. The stem 40 also may be provided on the portion thereof in the upper part of chamber 35 and above the higher of the two lands 43 and 44 with a wider cylindrical land 45, constituting a stem guide fitting slidably in the upper part of the chamber 35.

The bottom portion of the chamber 35 may be slightly enlarged to provide a lost motion chamber 46 and the portion of the stem extending therethrough is provided with a cylindrical flange or stop element 47 fitting slidably in chamber 46 and integral with the stem or rigidly secured thereto in any suitable known way.

The valve body 34 is provided with a pair of vertically spaced outlet ports 48 and 49, respectively, the vertical distance between the centers of these ports corresponding to the vertical distance between the centerlines of the valve elements 43 and 44. The relationship of the elements involved and the position of the valve stem part in the valve body part are such that when flange 47 is in a position midway of the vertical extent of lost motion chamber 46, the valve element 43 will close port 48 and valve element 44 will close port 49. The width of the periphery of the valve element 43 is just sufficient to block or substantially block the port 48 and the same is true of the valve element 44 with respect to port 49. An intake port 50 is provided in the valve body 34 at the side of the chamber 35 opposite the ports 48 and 49 and at a level midway between these ports. Thus, the intake port 50 communicates with the portion of valve chamber 35 that is located between the valve elements 43 and 44. When the valve body and the valve stem are in the relative positions shown in the drawings, this being the neutral position of the valve, hydraulic fluid under pressure that has been supplied through port 50, as presently will be explained, will fill the space in chamber 35 between valve elements 43 and 44.

The valve body 34 is provided with a drain port 51 which communicates with the chamber 35 above the level of the port 48 and hence above the valve element 43 and below land 45. A similar drain port 52 is provided in the valve body 34 below the level of the valve element 44 and outlet port 49 and above that of flange 47 in chamber 46.

It will be understood that in actual practice the valve body will be formed of suitable component parts suitably connected or joined together in a known manner to permit assembly of the valve body and valve stem parts as shown in Fig. 2 and as hereinbefore particularly described.

The lower end of valve stem 40 is pivotally connected, as by the pivot element 29, with the outer end portion of cam follower lever 25. A bracket 53 is provided on this pivotally attached lower end portion of valve stem 40 and carries an upstanding rigid rod 54 which is parallel with the valve stem. A vertically disposed cylindrical damping device body 55 is rigidly connected with the valve body 34, as by an integral attaching shank 56 welded at 57 to the adjacent side of the valve body, so that rod 54 extends vertically through cylindrical body 55 at the axial or vertical center line thereof. The member 55 may be closed at its upper and lower ends by caps 58 and 59, respectively, these caps having internally screw threaded skirts engaged at 60 and 61, respectively, with externally screw threaded end portions of the member 55. The caps 58 and 59 are provided with central openings 62 and 63, respectively, through which portions of the rod 54 extend slidably. The rod 54 is provided with a flange 64 formed integrally therewith or otherwise rigidly secured in any suitable known way to the portion of such rod that is located midway of the vertical extent of the cylindrical body member 55 when the valve body and stem parts are in the neutral positions thereof shown in Fig. 2 and the outer end of lever 25 is in its raised position as best seen in Fig. 1. A compression coil spring 65 is disposed on the portion of rod 54 between flange 64 and the upper cap 58 and a similar compression coil spring 66 is disposed on the portion of rod 54 between the flange 64 and the lower cap 59. The springs 65 and 66 exert mutually balancing pressures on the parts against which they react when the valve 33 is in its neutral position as shown in Fig. 2 and the flange 64 on the rod is in an intermediate position in the damping device body 55.

Upper outlet port 48 is operatively connected by a tubing 67 with one end of a hydraulic fluid cylinder 68 which is supported in a horizontal position at a relatively fixed station located above the level of the feeder plunger supporting arm 12. Cylinder 68 may be carried by suspension means indicated at 69 attached to a stationary girder or frame member 70. A tubing 71 operatively connects lower output port 49 with the opposite end of cylinder 68. In the example shown, the end of cylinder 68 to which tubing 71 is connected is nearest to the vertical axial line of feeder plunger 10 and therefore hereinafter will be referred to as the front end of cylinder 68. The end of cylinder 68 to which tubing 67 is connected is of course the rear end of the cylinder.

A piston 72 in cylinder 68 has a rod 73 connected to a rigid link 74. The link 74 is pivotally connected at 75 with one end of a bell crank lever 76 which is pivotally supported by a horizontal pivot element 77 on a stationary frame structure 78. The other end of bell crank lever 76 is pivotally connected by horizontal pivot element 79 with the upper end of a vertical rod 80, the lower end of which is pivotally connected by a pivot element 81 to an upstanding projection 82 on arm 12. The upstanding projection 82 is in line with and may be an extended upper end portion of vertical supporting shaft 13.

A second bell crank lever, indicated at 83, like the bell crank lever 76, is supported by a horizontal pivot element 84 on the supporting frame structure 78. The pivot elements 77 and 84 are at the same level and their axes are parallel. One end of bell crank lever 83 is pivotally connected by a horizontal pivot element 85 with one end of a horizontal cross rod 86, the opposite end of which is connected by the pivot element 75 to the same end of bell crank lever 76 as the link 74. A vertical rod 87 which is parallel with vertical rod 80 is pivotally connected at its upper end by a horizontal pivot element 88 with the second and lower end of bell crank 83. The lower end of rod 87 is pivotally connected by a horizontal pivot element 89 with an upward projection 90 on the outer end of the arm 12. Projection 90 may be an integral upper end portion of the chuck 11 by which plunger 10 is suspended from arm 12. With this arrangement, the upper cross rod 86 and arm 12 are substantially parallel with each other as are the vertical rods 80 and 87 and the bell cranks 76 and 83. The structure comprising these parts therefore acts substantially as a parallel motion device so that operation of the bell cranks by reciprocation of the piston 72 in hydraulic cylinder 68 will reciprocate the arm 12, chuck 11, plunger 10 and shaft 13 as a unit vertically without any appreciable bending moment on the shaft 13 or its bearings. The piston rod 73 may be kept horizontal during its reciprocation by the connected piston 72 by providing a supporting roller 91 on the piston rod 73 so that such roller rides along a horizontal slot 92 in stationary structure 78.

Pressure intake port 50 is connected by a tubing 93 with the outlet of a pump unit 94 with which a hydraulic fluid reservoir 95 is associated. Drain ports 51 and 52 are provided with drain tubings 96 and 97, respectively. These may be joined into a single tubing, as indicated at 98, discharging into the reservoir 95 or they might be extended separately to such reservoir.

The tubings referred to as connecting valve body 34 with the cylinder 68 and with the pump unit and reservoir are sufficiently flexible to permit such bodily movements of the valve body as occur during operation as hereinafter described.

In operation, the pump unit, which may be of any commercially available or other suitable known type, will operate to supply hydraulic fluid continuously through line 93 to the portion of valve chamber with which the port 50 communicates. The lines 71 and 67 from the control valve 33 to cylinder 68 will be continuously filled with hydraulic fluid as will all available space in the cylinder. A typical cycle of operations, starting with the plunger 10 at the lower limit of a downward stroke thereof as shown in Fig. 1, and with the parts of the operating mechanism in the relative positions shown in the same view, will now be described.

Rotation of cam 23 counterclockwise as shown by the arrow will cause the cam lever 25 to swing downward as the plunger rise portion 23a of the cam turns against cam follower 27. This will exert a downward pull on valve stem 40. The spring balanced damping device which connects the valve stem with the valve body, as shown in Fig. 2 and hereinbefore described, will tend to maintain the neutral position of these valve parts. However, it is desirable that the servo motor should sustain at least the major part of the load and provide at least most of the power required to reciprocate the feeder plunger, particularly when a relatively large and heavy plunger is employed. The spring 66 therefore may be sufficiently yielding to permit the stem 40 to be pulled slightly downward independently of the valve body which is restrained by the load thereon from following the valve stem. As soon as the ports 48 and 49 start to open as a result of this downward movement of the valve stem relative to the valve body, hydraulic fluid under pressure will enter line 71 leading to front end of hydraulic cylinder 68 and initiate a rearward movement of piston 72 in the cylinder. Power thus will be applied through the parallel motion lever-and-linkage connection of the piston rod with the feeder plunger assembly to initiate an upward stroke of the feeder plunger. This movement of piston 72 in cylinder 68 will cause hydraulic fluid equal to that entering line 71 to be forced through drain port 51 and line 96 toward the reservoir 95. Because of its connection through the stroke lever 30 with the feeder plunger assembly, the valve body 34 will start to move downward as soon as the piston starts to move rearwardly in cylinder 68. Preferably, the operation of the hydraulic servo motor to lift the feeder plunger will be initiated before the flange 47 in lost motion chamber 46 strikes the bottom of that chamber. The rate at which hydraulic fluid will be forced under pressure into the front end of the cylinder to drive the piston rearwardly therein will vary according to the extent to which the ports 48 and 49 are open at any given time and this in turn will depend upon the relative positions of the valve body 34 and valve stem 40 at that time. The arrangement and co-action of the parts involved and which have been described herein are such that the upward stroke of the plunger will be controlled as to speed and characteristics by the plunger rise portion of the rotating cam 23 co-acting with the lever 25 just as though the lever 25 were operatively connected by a rigid link with the stroke lever 30 as in the basic feeder of the prior art.

When the downward swinging movement of lever 25 has ceased, as occurs when the cam rise portion of rotating cam 23 passes the cam follower 27, the valve body 34 will move relative to the valve stem 40 to any extent required to close the ports 49 and 48. Any excess compression of the spring 66 over that of spring 65 will be relieved at the same time and the damping device will tend to restore and maintain the neutral position of the valve parts as shown in Fig. 2.

For the following return or downward stroke of the feeder plunger, the valve 40 will be moved upward relative to the valve body 34 sufficiently to open the ports 48 and 49 as the cam follower lever 25 starts its return, upward swinging movement. The hydraulic pressure fluid supply will now be through line 67 to the rearward end of cylinder 68 to impel piston 72 forwardly in such cylinder. The hydraulic servo motor thus will take over most of the load and supply the power to lower the plunger assembly. The connected valve body 34 will be raised by reason of its connection through stroke lever 30 with the plunger assembly. The speed and characteristics of the plunger down stroke will be determined by the shape of the plunger descent portion of the cam which is now being turned against cam follower 27.

The valve ports 48 and 49 will be closed again by the final upward shifting movement of the valve body relative to the valve stem as the cam 23 completes its cycle of rotation and the upward swinging movement of cam follower 25 ends. The parts of the plunger operating mechanism will then again be in the positions shown in the drawings.

In the specific example that has just been described, practically all the power requirements for the feeder plunger operation are supplied by the hydraulic power system, the cam and the elements of the lever-and-linkage system between the cam and the plunger assembly serving mainly for control of the hydraulic power system so as to control the timing and the characteristics of the feeder plunger strokes. However, should the hydraulic power system fail for any reason, the mechanical cam controlled system will, after a slight lost motion between the valve body and valve stem elements thereof, take over the load and the work of operating the feeder plunger, at least to the extent that the heavy plunger assembly will be prevented from falling out of control and operations will continue until orderly arrangements can be made to restore the hydraulic system to operation. By selection and use of a stronger damping device, as by inclusion of stronger and stiffer springs therein, the percentage of the total power demands to be supplied by the hydraulic power system can be reduced and selected.

Many modifications of and changes in the illustrative structure shown in the drawings and herein described will readily occur to those skilled in the art and I therefore do not wish to be limited to the details of such illustrative embodiment of the invention.

I claim:

1. In a glass feeder, a feeder plunger, vertically movable means supporting the plunger for vertical reciprocatory movements above and in operative relation to a glass feeder outlet, a stroke lever pivoted to swing about a fixed horizontal axis and operative-connected to said movable means for supporting the plunger, a cam mounted to rotate about a fixed horizontal axis parallel with and adjacent to the horizontal pivotal axis of the stroke lever, a lever provided with a cam follower and pivoted to swing about a horizontal axis parallel with the horizontal axis of rotation of the cam and located adjacent to said cam at the opposite side of the axis of the cam from the axis of the stroke lever, yieldable pressure applying means actuating said cam follower level to maintain said cam follower continuously in working contact with said cam, and a hydraulic servomotor system operatively connected to said movable supporting means for the feeder plunger and including a hydraulic control valve comprising two relatively movable cooperative valve parts, one connected to said stroke lever to move therewith and the other connected to said cam follower lever to move therewith.

2. In a glass feeder, a feeder plunger, vertically movable means supporting the plunger for vertical reciprocatory movements above and in operative relation to a glass feeder outlet, a stroke lever pivoted to swing about a fixed horizontal axis and operatively connected to said movable means for supporting the plunger, a cam mounted to rotate about a fixed horizontal axis parallel with and adjacent to the horizontal pivotal axis of the stroke lever, a lever provided with a cam follower and pivoted to swing about a horizontal axis parallel with the horizontal axis of rotation of the cam and located adjacent to said cam at the opposite side of the axis of the cam from the axis of the stroke lever, yieldable pressure applying means actuating said cam follower lever to maintain said cam follower continuously in working contact with said cam, a hydraulic control valve comprising two relatively movable cooperative valve parts, one connected to said stroke lever to move therewith and the other connected to said cam follower lever to move therewith, and double acting damping means operatively interconnecting said relatively movable valve parts.

3. In a glass feeder, a feeder plunger, vertically movable plunger supporting means, a rotary cam adjacent to said plunger supporting means, a plunger stroke lever operatively connected to said plunger supporting means, a cam follower lever operatively associated with said cam so as to be oscillated by rotation of the cam, a hydraulic pressure fluid motor operatively connected with said plunger supporting means, and a hydraulic pressure fluid system operatively connected with said motor and including a control valve comprising two relatively movable cooperatively associated valve parts, one operatively connected to one and the second to the other of said two levers.

4. In a glass feeder, a feeder plunger, vertically movable plunger supporting means, a rotary cam adjacent to said plunger supporting means, a plunger stroke lever operatively connected to said plunger supporting means, a cam follower lever operatively associated with said cam so as to be oscillated by rotation of the cam, a hydraulic pressure fluid motor operatively connected with said plunger supporting means, a hydraulic pressure fluid system operatively connected with said motor and including a control valve comprising two relatively movable cooperatively associated valve parts, one operatively connected to one and the second to the other of said two levers, and a spring balanced damping device forming a connection between said valve parts tending to maintain them in a particular relationship and yieldingly resisting movement of either relative to the other from that relationship.

5. In a glass feeder, a feeder plunger, vertically movable plunger supporting means, a cam mounted to rotate about a horizontal axis adjacent to said plunger supporting means, a vertically swingable plunger stroke lever operatively connected to the plunger supporting means, a vertically swingable cam follower lever arranged to be operated by rotation of the cam, a hydraulic pressure fluid valve comprising an elongate tubular valve body connected at one end to said plunger stroke lever and a valve stem having an end portion slidably disposed in the tubular valve body and its opposite end portion connected to said cam follower lever, a reciprocating piston type hydraulic pressure fluid motor, means operatively connecting said motor with said vertically movable plunger supporting means to raise and lower the same, a pair of hydraulic pressure fluid tubes respectively operatively connecting the valve body outlet ports with said motor, and a hydraulic pressure fluid tube operatively connecting said valve body intake port with a constant source of supply of hydraulic pressure fluid.

6. In a glass feeder, mechanism as specified in claim 5 wherein said valve body is formed internally to provide a lost motion chamber in a portion thereof and said stem is provided with a fixed stop element on a portion thereof extending through said lost motion chamber, said step element being located intermediate the opposite ends of said lost motion chamber when said stem is in a neutral position in said valve body and being adapted to contact with one end of said chamber to limit longitudinal movement of the stem in one direction from its neutral position and relative to the valve body and with the opposite end of said chamber to limit longitudinal movement of the stem in the opposite direction from said neutral position and relative to the valve body.

7. In a glass feeder, mechanism as specified by claim 5 and in addition a double acting, spring balanced, damping device operatively connecting said valve body and valve stem so as yieldingly to resist longitudinal movement of either said valve body or said stem relative to the other in either direction when said valve stem is in a neutral position.

8. In a glass feeder, mechanism as specified by claim 5 wherein said vertically movable plunger supporting means comprises a vertically movable supporting shaft to which said stroke lever is operatively connected, a substantially horizontal arm carried by and projecting laterally from said shaft, and means suspending said feeder plunger from said arm in horizontally spaced relation to said supporting shaft, and wherein the means operatively connecting said hydraulic pressure fluid motor with said vertically movable plunger supporting means comprises lever and linkage mechanisms constructed and arranged to transmit motion from said motor to said horizontal arm at points located both above said feeder plunger and said vertical shaft so as to avoid any appreciable bending moment on said arm or vertical shaft during raising and lowering of the plunger supporting means by said motor.

9. In a glass feeder, mechanism comprising a vertically movable feeder plunger supporting mechanism, a hydraulic pressure fluid power system operatively connected to said plunger supporting mechanism to reciprocate it vertically, said power system including a control valve comprising telescopically associated relatively movable valve body and valve stem parts constructed and arranged to control the operation of said power system in accordance with relative movements between said valve parts, a rotary cam and a lever and linkage mechanism operatively connected at one end to said vertically movable plunger supporting mechanism and operatively associated at its opposite end with said cam so as to be actuated by rotation of the latter, said lever and linkage mechanism including said relatively movable valve parts as a plural part link having limited lost motion between the parts thereof and operable in response to rotation of the cam to control the operation of the hydraulic power system in such manner that the characteristics of the reciprocatory movements of the plunger supporting mechanism caused by the power system are determined by said cam and so that said lever and linkage system will take over the operation of reciprocating the plunger supporting mechanism should the hydraulic power system become inoperative during continued rotation of the cam.

10. A glass feeder plunger operating mechanism as specified by claim 9 and in addition means interconnecting the relatively movable valve parts to dampen relative movements between them from a neutral relationship thereof.

References Cited in the file of this patent
UNITED STATES PATENTS
2,246,461   Cannon _____ June 17, 1941